(12) United States Patent
Liu et al.

(10) Patent No.: US 11,683,578 B2
(45) Date of Patent: Jun. 20, 2023

(54) EXTRACTION OF TARGET PERSON FROM IMAGE

(71) Applicant: NEC CORPORATION, Tokyo (JP)

(72) Inventors: Jianquan Liu, Tokyo (JP); Maguell Luka Timir Lano Sandifort, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/965,340

(22) PCT Filed: Oct. 18, 2018

(86) PCT No.: PCT/JP2018/038797
§ 371 (c)(1),
(2) Date: Jul. 28, 2020

(87) PCT Pub. No.: WO2019/146184
PCT Pub. Date: Aug. 1, 2019

(65) Prior Publication Data
US 2021/0127056 A1 Apr. 29, 2021

(30) Foreign Application Priority Data
Jan. 29, 2018 (JP) .............................. JP2018-012296

(51) Int. Cl.
*H04N 23/611* (2023.01)
*H04N 7/18* (2006.01)
(Continued)

(52) U.S. Cl.
CPC .......... *H04N 23/611* (2023.01); *G06V 40/10* (2022.01); *G06V 40/20* (2022.01); *H04N 7/18* (2013.01)

(58) Field of Classification Search
None
See application file for complete search history.

(56) References Cited

U.S. PATENT DOCUMENTS 8,334,906 B2 * 12/2012 Lipton ............. G08B 13/19686
348/169
9,286,775 B2 * 3/2016 Mori ................ G08B 13/19606
(Continued)

FOREIGN PATENT DOCUMENTS

| JP | H07-302328 A | 11/1995 |
| JP | 2014-155159 A | 8/2014 |

(Continued)

OTHER PUBLICATIONS

Shian-Ru Ke et al., "A Review on Video-Based Human Activity Recognition", Computers, 2013, pp. 88-131, 2(2).
(Continued)

*Primary Examiner* — Stefan Gadomski

(57) ABSTRACT

Provided is a processing apparatus (10) including a person detection unit (11) that detects a person from an image generated by a camera that photographs a target area, a computation unit (12) that analyzes the image and computes, for each person, a stay time in the target area and a degree of bias of an appearance position in the target area, and a target person extraction unit (13) that extracts a target person who is a person for whom a computation result by the computation unit (12) satisfies a predetermined condition.

13 Claims, 7 Drawing Sheets

(51) Int. Cl.
*G06V 40/10* (2022.01)
*G06V 40/20* (2022.01)

(56) References Cited

U.S. PATENT DOCUMENTS

| | | | | |
|---|---|---|---|---|
| 10,121,062 | B2* | 11/2018 | Heinrich | G06K 9/628 |
| 2007/0248244 | A1* | 10/2007 | Sato | G08B 13/19608 |
| | | | | 382/103 |
| 2007/0285510 | A1* | 12/2007 | Lipton | G08B 13/19689 |
| | | | | 348/135 |
| 2009/0115617 | A1* | 5/2009 | Sano | H04L 67/306 |
| | | | | 340/573.1 |
| 2010/0157057 | A1* | 6/2010 | Lim | H04N 7/18 |
| | | | | 348/148 |
| 2010/0232644 | A1* | 9/2010 | Hsiao | G06K 9/00771 |
| | | | | 382/103 |
| 2012/0057786 | A1* | 3/2012 | Yano | H04N 5/23219 |
| | | | | 382/170 |
| 2012/0293687 | A1* | 11/2012 | Karn | H04N 5/23219 |
| | | | | 348/231.99 |
| 2014/0226857 | A1 | 8/2014 | Mineshita | |
| 2014/0245367 | A1* | 8/2014 | Sasaki | H04N 21/6175 |
| | | | | 725/109 |
| 2015/0095107 | A1* | 4/2015 | Matsumoto | G06K 9/00771 |
| | | | | 705/7.29 |
| 2015/0187088 | A1* | 7/2015 | Iwai | G06K 9/00771 |
| | | | | 345/634 |
| 2015/0348382 | A1* | 12/2015 | Michihata | G06K 9/00771 |
| | | | | 382/103 |
| 2016/0055651 | A1 | 2/2016 | Oami | |
| 2016/0323532 | A1* | 11/2016 | Gouda | G09G 5/00 |
| 2018/0061161 | A1* | 3/2018 | Nagao | G07C 9/38 |
| 2018/0181815 | A1* | 6/2018 | Kanda | H04N 7/18 |
| 2018/0188892 | A1* | 7/2018 | Levac | G06F 3/0425 |
| 2018/0253597 | A1* | 9/2018 | Kozakaya | G08B 13/196 |
| 2019/0156508 | A1* | 5/2019 | Hirakawa | H04N 5/232 |

FOREIGN PATENT DOCUMENTS

| | | | |
|---|---|---|---|
| JP | 2015-049574 A | | 3/2015 |
| JP | 2015-139007 A | | 7/2015 |
| JP | 6234827 B2 | * | 11/2017 |
| WO | 2014/109127 A1 | | 7/2014 |
| WO | 2014/171258 A1 | | 10/2014 |
| WO | 2017/077902 A1 | | 5/2017 |
| WO | 2017/169189 A1 | | 10/2017 |
| WO | 2017/212568 A1 | | 12/2017 |

OTHER PUBLICATIONS

Hector F. Gomez A et al., "Identification of Loitering Human Behaviour in Video Surveillance Environments", In International Work-Conference on the Interplay Between Natural and Artificial Computation, Springer, Chem., 2015, pp. 516-525.
Henri Bouma et al., "Real-time tracking and fast retrieval of persons in multiple surveillance cameras of a shopping mall", Society of Photo-Optical Instrumentation Engineers (SPIE), 2013, vol. 8756, 13 pages.
Yunyoung Nam, "Loitering detection using an associating pedestrian tracker in crowded scenes", Multimedia Tools and Applications, 2015, 74(9), 1 page.
Guogang Xion et al., "Abnormal Crowd Behavior Detection Based on the Energy Model", In Information and Automation (ICIA), 2011 IEEE International Conference on on Information and Automation, pp. 495-500.
International Search Report for PCT/JP2018/038797, dated Jan. 8, 2019.
Japanese Office Communication for JP Application No. 2019-567850 dated Mar. 8. 2022 with English Translation.

* cited by examiner

EXTRACTION OF TARGET PERSON FROM IMAGE

CROSS REFERENCE TO RELATED APPLICATIONS

This application is a National Stage of International Application No. PCT/JP2018/038797 filed Oct. 18, 2018, claiming priority based on Japanese Patent Application No. 2018-012296 filed Jan. 29, 2018, the entire disclosure of which is incorporated herein.

TECHNICAL FIELD

The present invention relates to a processing apparatus, a processing method, and a program.

BACKGROUND ART

Patent Document 1 discloses a technique for detecting a person from an image and extracting a person for whom an appearance frequency to an image is higher than a predetermined level from the detected persons.

Non-Patent Documents 1 to 5 disclose techniques for analyzing images and extracting a person who exhibits a predetermined behavior.

RELATED DOCUMENT

Patent Document

[Patent Document 1] International Publication No. WO2017/077902
[Patent Document 2] International Publication No. WO2014/109127
[Patent Document 3] Japanese Patent Application Publication No. 2015-49574

Non-Patent Document

[Non-Patent Document 1] Ke, S. R., Thuc, H. L. U., Lee, Y. J., Hwang, J. N., Yoo, J. H., & Choi, K. H. (2013). A review on video-based human activity recognition. Computers, 2(2), 88-131.
[Non-Patent Document 2] Tomas, R. M., Tapia, S. A., Caballero, A. F., Ratte, S., Eras, A. G., & Gonzalez, P. L. (2015, June). Identification of loitering human behaviour in video surveillance environments. In International Work-Conference on the Interplay Between Natural and Artificial Computation (pp. 516-525). Springer, Cham.
[Non-Patent Document 3] Bouma, H., Baan, J., Landsmeer, S., Kruszynski, C., van Antwerpen, G., & Dijk, J. (2013). Real-time tracking and fast retrieval of persons in multiple surveillance cameras of a shopping mall. Bellingham, Wash.: SPIE.
[Non-Patent Document 4] Nam, Y. (2015). Loitering detection using an associating pedestrian tracker in crowded scenes. Multimedia Tools and Applications, 74(9), 2939-2961.
[Non-Patent Document 5] Xiong, G., Wu, X., Chen, Y. L., & Ou, Y. (2011, June). Abnormal crowd behavior detection based on the energy model. In Information and Automation (ICIA), 2011 IEEE International Conference on (pp. 495-500). IEEE.

SUMMARY OF THE INVENTION

Technical Problem

By using the technique disclosed in Patent Document 1, it is possible to extract a person who is prowling around a predetermined place for a criminal preliminary inspection or the like by extracting a person for whom an appearance frequency to an image obtained by photographing the place is higher than a predetermined level. However, in a case of the extraction based only on the appearance frequency, not only the prowling person but also a person who is staying at the place for a relatively long time simply for the purpose of meeting or the like is extracted. Non-Patent Documents 1 to 5 do not provide means for solving the problem.

An object of the present invention is to provide a technique for extracting a person who is prowling around a certain place with high accuracy.

Solution to Problem

According to the present invention, there is provided a processing apparatus including:
a person detection unit that detects a person from an image generated by a camera that photographs a target area,
a computation unit that analyzes the image and computes, for each person, a stay time in the target area and a degree of bias of an appearance position in the target area, and
a target person extraction unit that extracts a target person who is a person for whom a computation result by the computation unit satisfies a predetermined condition.

Further, according to the present invention, there is provided a processing apparatus including:
a person detection unit that detects a person from an image generated by a camera that photographs a target area,
a computation unit that analyzes the image and computes, for each person, a frequency of framing in the image, and
a target person extraction unit that extracts a target person who is a person for whom the frequency of framing in the image satisfies a predetermined condition.

Further, according to the present invention, there is provided a processing method executed by a computer, the method including:
a person detection step of detecting a person from an image generated by a camera that photographs a target area,
a computation step of analyzing the image and computing, for each person, a stay time in the target area and a degree of bias of an appearance position in the target area, and
a target person extraction step of extracting a target person who is a person for whom a computation result in the computation step satisfies a predetermined condition.

Further, according to the present invention, there is provided a program causing a computer to function as:
a person detection unit that detects a person from an image generated by a camera that photographs a target area,
a computation unit that analyzes the image and computes, for each person, a stay time in the target area and a degree of bias of an appearance position in the target area, and
a target person extraction unit that extracts a target person who is a person for whom a computation result by the computation unit satisfies a predetermined condition.

Further, according to the present invention, there is provided a processing method executed by a computer, the method including:

a person detection step of detecting a person from an image generated by a camera that photographs a target area, a computation step of analyzing the image and computing, for each person, a frequency of framing in the image, and a target person extraction step of extracting a target person who is a person for whom the frequency of framing in the image satisfies a predetermined condition.

Further, according to the present invention, there is provided a program causing a computer to function as:

a person detection unit that detects a person from an image generated by a camera that photographs a target area, a computation unit that analyzes the image and computes, for each person, a frequency of framing in the image, and a target person extraction unit that extracts a target person who is a person for whom the frequency of framing in the image satisfies a predetermined condition.

Advantageous Effects of Invention

According to the present invention, a technique for extracting a person who is prowling around a certain place with high accuracy is realized.

BRIEF DESCRIPTION OF THE DRAWINGS

The above and other objects, features and advantages will become more apparent from the preferred example embodiments described below and the accompanying drawings.

DESCRIPTION OF EMBODIMENTS

First, a correspondence between first to fifth values represented in the claims and the names in the specification will be described.

First value: "a value obtained by integrating a stay time of each person in a target area and a degree of bias ($E_{total}$) of an appearance position in the target area"

Second value: "a value indicating a frequency with which each detected person was photographed by each camera"

Third value: "a value indicating a frequency with which each person exists in each small area of an image generated by each camera"

Fourth value: "a value obtained by integrating the first value and a frequency of framing in of each person to the image"

Fifth value: "a value obtained by correcting the fourth value"

Next, an outline of the processing apparatus of the present example embodiment will be described. The processing apparatus of the present example embodiment analyzes an image generated by a camera (for example, a surveillance camera) installed in a target area, and detects persons in the image. Next, the processing apparatus evaluates a behavior of the detected person based on "the stay time in the target area", "the degree of bias of the appearance position in the target area (degree of dispersion)", "the frequency of framing in the image", and the like. Then, the processing apparatus extracts a person whose evaluation result satisfies a predetermined condition as "a person prowling around the target area".

According to such a processing apparatus of the present example embodiment, a person who is prowling around the target area can be extracted with high accuracy.

Next, a configuration of the processing apparatus of the present example embodiment will be described in detail. First, an example of a hardware configuration of the processing apparatus will be described. Each functional unit included in the processing apparatus is realized by any combination of hardware and software centering on a Central Processing Unit (CPU) of any computer, a memory, a program loaded into the memory, a storage unit (capable of storing, in addition to programs stored from the stage of shipment of the apparatus in advance, programs downloaded from storage media such as Compact Discs (CDs) and servers on the Internet.) such as a hard disk for storing the program and an interface for network connection. It will be understood by those skilled in the art that there are various modification examples in the method and apparatus for realizing the functional unit.

Figure 1:
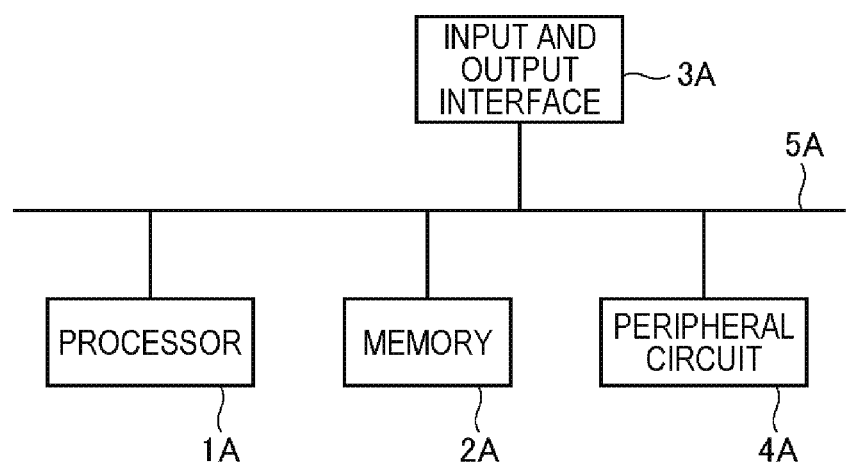
FIG. 1 is a diagram showing an example of a hardware configuration of a processing apparatus according to the present example embodiment.

FIG. 1 is a block diagram showing a hardware configuration of a processing apparatus according to the present example embodiment. As shown in FIG. 1, the processing apparatus includes a processor 1A, a memory 2A, an input and output interface 3A, a peripheral circuit 4A, and a bus 5A. The peripheral circuit 4A includes various modules. Note that, the peripheral circuit 4A may not be provided.

The bus 5A is a data transmission path through which the processor 1A, the memory 2A, the peripheral circuit 4A, and the input and output interface 3A mutually transmit and receive data. The processor 1A is an arithmetic processing apparatus such as a Central Processing Unit (CPU) and a Graphics Processing Unit (GPU). The memory 2A is a memory such as a Random Access Memory (RAM) and a Read Only Memory (ROM). The input and output interface 3A includes interfaces for acquiring information from an input apparatus (for example, a keyboard, a mouse, a microphone, and the like), an external apparatus, an external server, an external sensor, and the like, and interfaces for outputting information to an output apparatus (for example, a display, a speaker, a printer, an emailer, and the like), an external apparatus, an external server, and the like. The processor 1A can issue a command to each module and perform a computation based on the computation results thereof.

Figure 2:
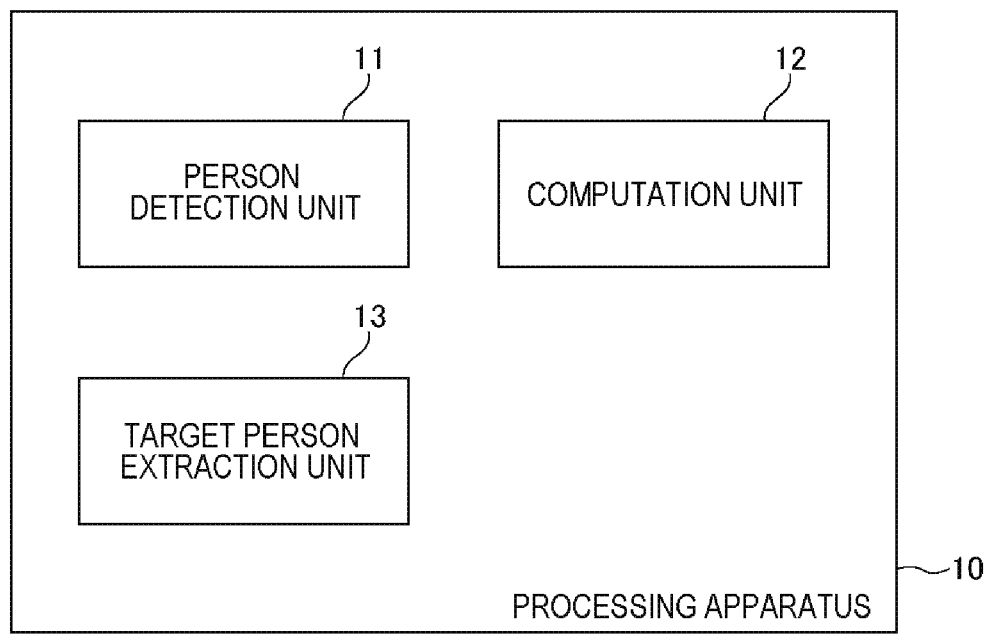
FIG. 2 is a diagram showing an example of a functional block diagram of a processing apparatus according to the present example embodiment.

Next, the functional configuration of the processing apparatus will be described. As shown in the functional block diagram of FIG. 2, the processing apparatus 10 includes a person detection unit 11, a computation unit 12, and a target person extraction unit 13. Hereinafter, each functional unit will be described in detail.

The person detection unit 11 analyzes an image generated by a camera that photographs the target area, and detects persons in the image.

Figure 3:
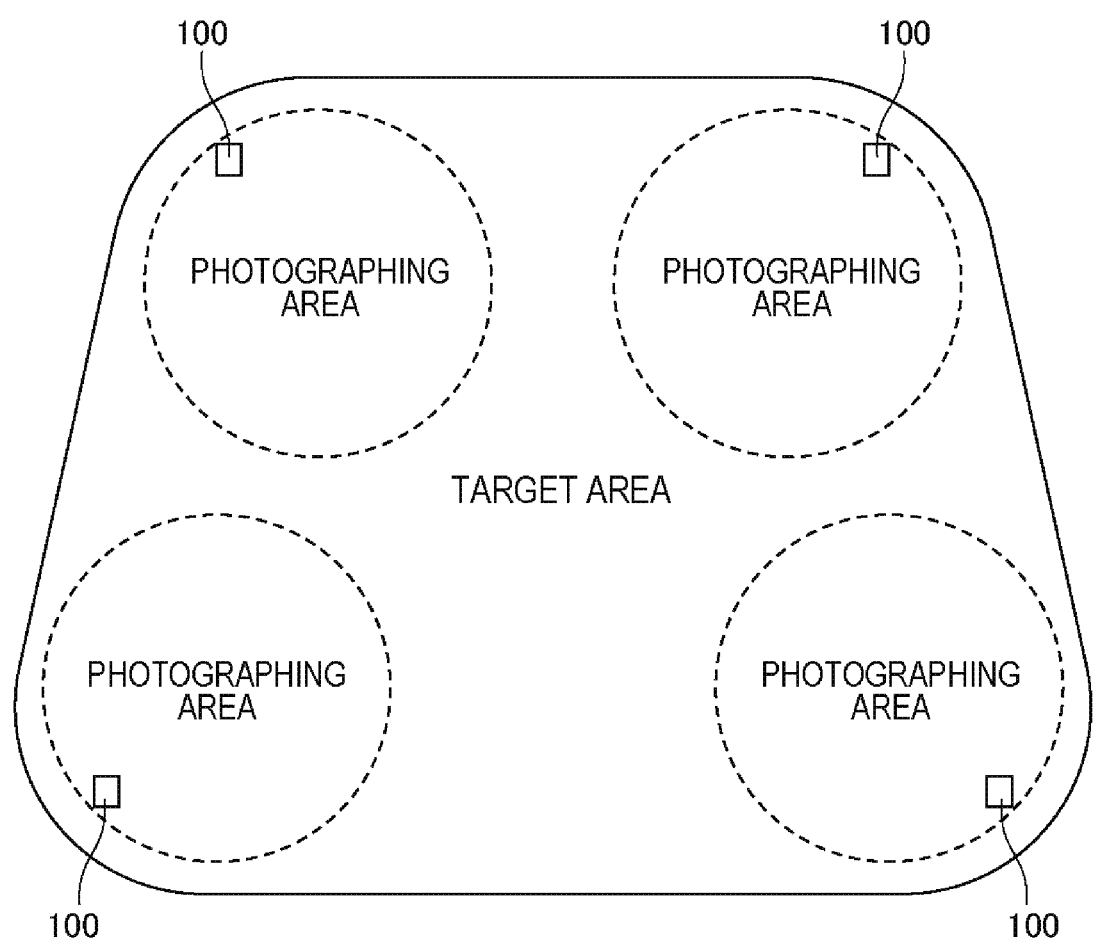
FIG. 3 is a diagram schematically showing an example of a camera installed in a target area.

The target area is, for example, a park, a station yard, a station square, a building, or the like, but is not limited thereto. One or more cameras (surveillance cameras) that photograph at least a part of the target area are installed in the target area. The camera continuously photographs moving images. FIG. 3 shows an example. In the example shown in the drawing, four cameras 100 are installed in one target area. The photographing area of each camera 100 is indicated by a dotted line.

The person detection unit 11 analyzes the image of each frame generated by the camera 100 and detects persons from the image of each frame. The means for detecting a person is not particularly limited, and any technique can be adopted.

Then, the person detection unit 11 groups the persons detected from the image of each frame by those having the same or similar appearance (for example, face, clothes, and the like). Thereby, the same person existing over the images of a plurality of frames is put together. When the target area is photographed by a plurality of cameras 100, the persons detected from the images of the plurality of frames generated by the plurality of cameras 100 are grouped by the same means, so that the same person existing over the images of the plurality of frames generated by the plurality of cameras 100 is put together.

The following can be considered as an example of the grouping processing. For example, the person detection unit 11 detects a person from each of the images of the plurality of frames. Then, the person detection unit 11 determines whether the appearance of the person detected from the image of a certain frame (frame being processed) and the appearance of the person detected from the image of the previous frame (processed frame) are similar to each other at a predetermined level or more, and groups those having similarities at a predetermined level or more. The above determination may be performed by comparing all pairs of an appearance feature of each of all the persons detected from the image of the processed frame and an appearance feature of each of all the persons detected from the image of the frame being processed. However, in a case of such processing, as the accumulated data of the person increases, the number of pairs to be compared increases, and the processing load on the computer increases. Therefore, for example, the following method may be adopted.

Figure 4:
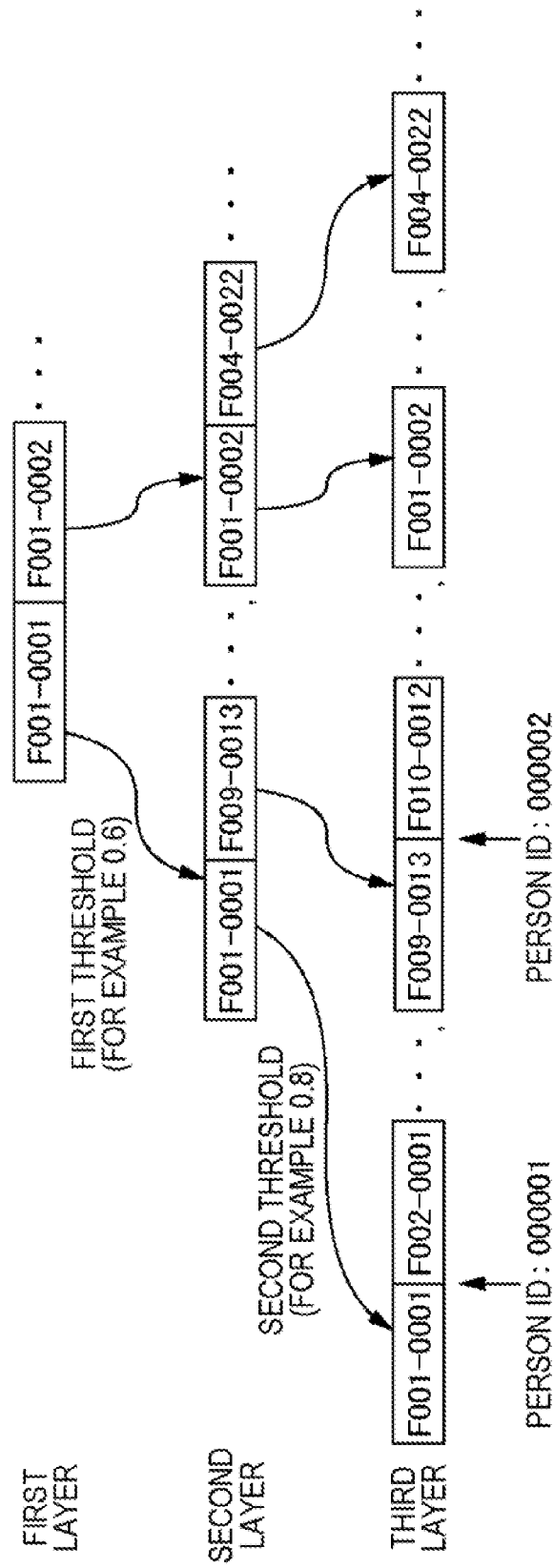
FIG. 4 is a diagram schematically showing an example of index information used in person detection processing.

That is, the detected persons may be indexed as shown in FIG. 4, and the persons whose appearance is similar to each other at a predetermined level or more may be grouped using the index. Details of the index and a method of generating the index are disclosed in Patent Documents 2 and 3, but will be briefly described below.

The detection ID shown in FIG. 4: "Fooo-oooo" is identification information given to each person detected from the image of each frame. Fooo is frame identification information, and information after the hyphen is the identification information of each person detected from the image of each frame. When the same person is detected from images of different frames, a different detection ID is assigned to each of them.

In the third layer, nodes corresponding to all of the detection IDs obtained from the frames processed so far (processed frames) are arranged. Then, the plurality of nodes arranged in the third layer are grouped by putting together the nodes having a similarity (similarity of an appearance feature value) of equal to or more than a first level. In the third layer, a plurality of detection IDs determined to be the same person are grouped. The person identification information (person identifier (ID)) is assigned to each group of the third layer.

In the second layer, one node (representative) selected from each of the plurality of groups in the third layer is arranged. Each node of the second layer is linked to the group which is a selection source (the group to which the node belongs) located in the third layer. Then, the plurality of nodes arranged in the second layer are grouped by putting together the nodes having a similarity of equal to or more than a second level. Note that, the second level is lower than the first level. That is, nodes that are not grouped when based on the first level may be grouped when based on the second level.

In the first layer, one node (representative) selected from each of the plurality of groups in the second layer is arranged. Each node in the first layer is linked to the group which is the selection source (the group to which the node belongs) located in the second layer.

The index is updated as follows. When a new detection ID is obtained from a new frame (frame being processed), first, a plurality of detection IDs located in the first layer are set as comparison targets. That is, a pair of the new detection ID and each of the plurality of detection IDs located in the first layer is created. Then, the similarity (similarity of the appearance feature value) is computed for each pair, and it is determined whether the computed similarity is equal to or more than a first threshold (similarity equal to or more than a predetermined level).

In a case where there is no detection ID of which the similarity is equal to or more than the first threshold in the first layer, it is determined that the person corresponding to the new detection ID is not the same person as the person detected before. Then, the new detection ID is added to the first to third layers and they are linked to each other. In the second and third layers, a new group is generated by the added new detection ID. Also, a new person ID is issued corresponding to the new group in the third layer. Then, the person ID is determined as the person ID of the person corresponding to the new detection ID.

On the other hand, when there is a detection ID of which the similarity is equal to or more than the first threshold in the first layer, the comparison target is moved to the second layer. Specifically, the group of the second layer linked to the "detection ID of the first layer of which the similarity is determined to be equal to or more than the first threshold" is set as the comparison target.

Then, a pair of the new detection ID and each of the plurality of detection IDs included in the group to be processed in the second layer is created. Next, the similarity is computed for each pair, and it is determined whether the computed similarity is equal to or more than a second threshold. Note that, the second threshold is greater than the first threshold.

In a case where there is no detection ID of which the similarity is equal to or more than the second threshold in the group to be processed in the second layer, it is determined that the person corresponding to the new detection ID is not the same person as the person detected before. Then, the new detection ID is added to the second layer and the third layer, and linked to each other. In the second layer, the new detection ID is added to the group to be processed. In the third layer, a new group is generated by the added new detection ID. Also, a new person ID is issued corresponding to the new group in the third layer. Then, the person ID is determined as the person ID of the person corresponding to the new detection ID.

On the other hand, in a case where there is a detection ID of which a similarity is equal to or more than the second threshold in the group to be processed in the second layer, it is determined that the person corresponding to the new detection ID is the same person as the person detected before. Then, the new detection ID is made to belong to the group of the third layer linked to the "detection ID of the second layer of which the similarity is determined to be equal to or more than the second threshold". Further, the person ID corresponding to the group in the third layer is determined as the person ID of the person corresponding to the new detection ID.

For example, as described above, the detection ID (person) detected from the image of the new frame can be added to the index of FIG. 4 and the person ID can be associated with each of them.

Returning to FIG. 2, the computation unit 12 analyzes the image generated by the camera 100, and for each person (hereinafter, simply referred to as "per person") detected by the person detection unit 11, at least some of "stay time in the target area", "degree of bias of the appearance position in the target area", "value (first value) obtained by integrating the stay time in the target area and the degree of bias of the appearance position in the target area", "frequency of framing in the image", "value (fourth value) obtained by integrating the first value and the frequency of framing in the image", and "value obtained by correcting the fourth value" is computed. The target person extraction unit 13 described below extracts a person presumed to be prowling around the target area from among the persons detected by the person detection unit 11 based on the computation results. Hereinafter, each value will be described in detail.

"Stay Time in Target Area"

The persons prowling around the target area tend to stay longer in the target area. By using the stay time, a person prowling around the target area can be extracted with high accuracy.

Hereinafter, an example of the method of computing the stay time will be described, but the present invention is not limited to this example.

Computation Example 1 of Stay Time

The computation unit 12 may compute the total time during which each person is photographed by the camera 100 as the stay time of each person in the target area. When a plurality of cameras 100 are installed in the target area, the computation unit 12 may compute the total time obtained by adding up the time during which each person is photographed by each of the plurality of cameras 100 as the stay time of each person in the target area.

Computation Example 2 of Stay Time

In addition, when there is an entrance and exit in the target area and there is a camera 100 that photographs the entrance and exit, the computation unit 12 may analyze the image of the camera 100 and detect that each person "moves into the target area" and "moves out of the target area". Then, the time from when each person moves into the target area to when each person moves out of the target area may be computed as the stay time of each person in the target area.

"Degree of Bias of Appearance Position in Target Area"

The persons prowling around the target area tend to have an appropriate variation in the appearance position in the target area (the bias of the appearance position is small). That is, it is unlikely that the appearance frequency in a certain position becomes significantly higher than the appearance frequency in another position (the appearance position is biased toward a certain position). Note that, the tendency of the appearance position being biased toward a certain position is seen, for example, in a subject that performs different actions from "prowling", such as "meeting". By using the degree of bias of the appearance position in the target area (hereinafter, simply referred to as "degree of bias"), it is possible to extract a person who is prowling around the target area with high accuracy. Hereinafter, an example of a method of computing the degree of bias will be described, but the present invention is not limited to this example.

Computation Example 1 of Degree of Bias

The computation unit 12 computes a value (second value) indicating the frequency with which each detected person is photographed by each camera 100 for each detected person and each camera 100. Further, the computation unit 12 divides the image generated by each camera 100 into a plurality of small areas, and computes, for each detected person, for each camera 100, and for each small area, a value (third value) indicating the frequency with which each person exists in each small area of the image generated by each camera 100.

Then, the computation unit 12 computes the degree of bias ($E_{total}$) of the appearance position in the target area based on the second value and the third value for each detected person.

The persons prowling around the target area tend to be evenly photographed by the plurality of cameras 100. For this reason, the variation of the plurality of second values computed for each camera 100 corresponding to the person who is prowling around the target area is decreased. On the other hand, for example, the frequency with which the person, who is in the target area for a meeting or the like, is photographed by the camera 100 that photographs the meeting place is higher than the frequency with which the person is photographed by another camera 100. For this reason, the variation of the plurality of second values computed for each camera 100 with respect to the person who is meeting with another person is increased.

In addition, a person prowling around the target area tends to move relatively frequently in the image generated by each camera 100. For this reason, the variation of the plurality of third values computed for each small area with respect to the person who is prowling around the target area is decreased. On the other hand, a person who is in the target area, for example, for a meeting or the like, does not move much in the image generated by the camera 100 and tends to stay at a predetermined place. For this reason, the variation of the plurality of third values computed for each small area with respect to the person who is meeting with another person is increased.

By the degree of bias ($E_{total}$) of the appearance position in the target area computed based on the second value and the third value, the bias of the appearance position of each person in the target area can be represented with high accuracy.

Hereinafter, a specific example of computing $E_{total}$ will be described, but this is merely an example and the present invention is not limited to this.

The frequency of being photographed with each of the plurality of cameras 100 can be set as the total time (or the total number of frames) during which each person is photographed with each of the plurality of cameras 100, for example. The computation unit 12 computes $P_j$ (second value) for each person and for each camera 100, for example, based on the following Equation (1). j is a camera ID. $P_j$ is a value obtained by normalizing the total time during which each person is photographed by the camera 100 determined by j with the stay time of each person in the target area.

$$P_j = \frac{\text{total time of being photographed by camera } j}{\text{stay time in target area}} \quad \text{Equation (1)}$$

Figure 5:
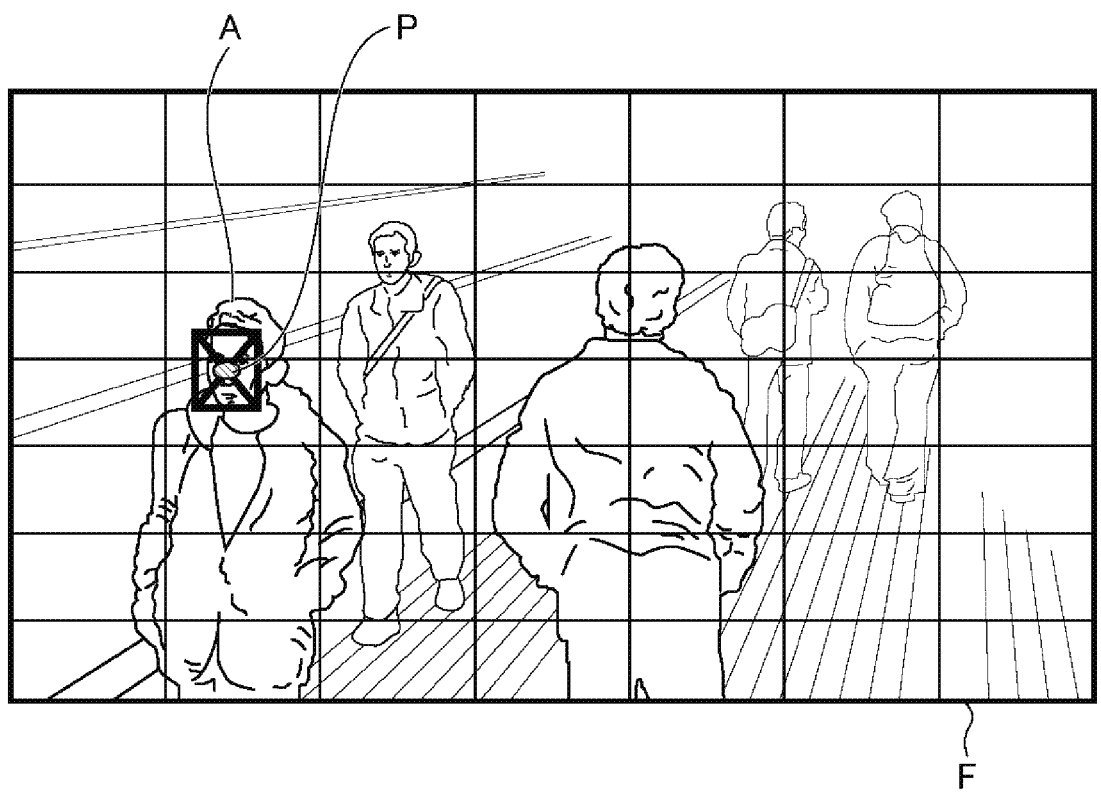
FIG. 5 is a diagram showing an example of processing performed by a computation unit.

Further, as shown in FIG. 5, the computation unit 12 divides each image F generated by each camera 100 into a plurality of small areas A based on a predetermined rule. In the example shown in the drawing, the image is divided into a total of 49 small areas A (7 vertical×7 horizontal). Then, the small area A in which the predetermined place P (for example, nose or the like) of each person exists is determined as the small area A in which each person exists. The computation unit 12 determines the small area A where each person exists for each frame by performing the same processing on the images of the plurality of frames. By summing up the results of the determination, the frequency (total time, total number of frames, and the like) with which each person exists in each of the plurality of small areas A in the image generated by each camera 100 is computed.

Then, the computation unit 12 computes $he_j$ (third value) for each camera 100 based on, for example, the following Equation (2). j is a camera ID. i is a small area ID. m is the number of small areas.

$$he_j = -\sum_{i=1}^{m} b_i \log(b_i) \quad \text{Equation (2)}$$

$b_i$ is defined by the following Equation (3-1). The $b_i$ defined by the following Equation (3-1) is a value obtained by normalizing the number of times (total number of frames) each person exists in the small area determined by i with the number of times (total number of frames) each person exists in the image (frame image) generated by the camera 100 determined by j. Note that, $b_i$ may be defined by the following Equation (3-2). The $b_i$ defined by the following Equation (3-2) is a value obtained by normalizing the total time during which each person exists in the small area determined by i with the total time (total time during which each person is photographed by camera 100 determined by j) each person exists in the image generated by the camera 100 determined by j. The $b_i$ defined by the following Equation (3-1) and the $b_i$ defined by the following Equation (3-2) have the same meaning.

$$b_i = \frac{\text{total number of frames in which each person exists in small area } i}{\text{total number of frames in which each exists in frame generated by camera } j} \quad \text{Equation (3-1)}$$

$$b_i = \frac{\text{total time during which each person exists in small area } i}{\text{total time during which each person is photographed by camera } j} \quad \text{Equation (3-2)}$$

Then, the computation unit 12 computes $E_j$ for each person and for each camera 100, for example, based on the following Equation (4). j is a camera ID.

$$E_j = he_j \times P_j \quad \text{Equation (4)}$$

Then, the computation unit 12 computes $E_{total}$ indicating the degree of bias of the appearance position in the target area for each person based on, for example, the following Equation (5). j is a camera ID. n is the number of cameras 100. The computation unit 12 computes $E_{total}$ indicating the degree of bias for each person detected by the person detection unit 11.

$$E_{total} = \sum_{j=1}^{n} E_j \quad \text{Equation (5)}$$

In a case of the example, $E_{total}$ increases as the variation in the second value decreases (the bias is large), and increases as the variation in the third value decreases (the bias is large).

Computation Example 2 of Degree of Bias

The computation unit 12 computes $E_{total}$ indicating the degree of bias based on the second value. For example, $P_j$ (second value) may be computed for each person and for each camera 100 based on the above Equation (1) in the same manner as in Computation Example 1 of the degree of variation. Then, the above Equation (4) may be changed to "$E_j = P_j$", and $E_{total}$ may be computed for each person based on the above Equation (5).

In a case of the example, $E_{total}$ increases as the variation in the second value decreases (the bias is large).

Computation Example 3 of Degree of Bias

The computation unit 12 computes $E_{total}$ indicating the degree of bias based on the third value. For example, $he_j$ (third value) may be computed for each person and for each camera 100 based on the above Equation (2) in the same manner as in Computation Example 1 of the degree of variation. Then, the above Equation (4) may be changed to "$E_j = he_j$", and $E_{total}$ may be computed for each person based on the above Equation (5).

In a case of the example, $E_{total}$ increases as the variation in the third value decreases (the bias is large).

"A Value Obtained by Integrating stay time in Target Area and Degree of Bias ($E_{total}$) of Appearance Position in Target Area (First Value)"

The persons who are prowling around the target area tend to have a longer stay time. However, for example, a person who is meeting with another person may also have a longer stay time. For this reason, a prowling person cannot be extracted with high accuracy only by the length of the stay time.

In addition, a person who is prowling around the target area tends to have a relatively small bias of the appearance position in the target area. However, a person who has simply passed through the target area may have a smaller bias. For this reason, a prowling person cannot be extracted with high accuracy only by the magnitude of the bias.

By using the two indices of "stay time" and "degree of bias", it is possible to extract a person who is prowling around the target area with high accuracy. The tendency of the index of each of a person who is prowling, a person who is meeting with another person, and a person who has just passed is summarized as follows.

A person who is prowling has: a "large" tendency of the stay time in the target area and a "small" tendency of bias of the appearance position in the target area.

A person who is meeting with another person has: a "large" tendency of the stay time in the target area and a "large" tendency of the bias of the appearance position in the target area.

A person who has just passed has: a "small" tendency of the stay time in the target area and a "small" tendency of the bias of the appearance position in the target area.

The computation unit 12 may compute a DS (first value) for each person based on, for example, the following Equation (6). The method of computing the "stay time in the target area" and $E_{total}$ is as described above.

$$DS = (\text{stay time in target area}) \times E_{total} \qquad \text{Equation (6)}$$

In the case of the above equation, as the stay time in the target area is larger, the DS becomes larger. Further, as the bias of the appearance position in the target area is smaller, the DS becomes a larger value.

The tendency of the "stay time in the target area", the $E_{total}$, and the DS for each of the person who is prowling, the person who is meeting with another person, and the person who has just passed is summarized as follows.

The person who is prowling has: a "large" tendency of the stay time in the target area and a "large" tendency of the $E_{total}$.

The person who is meeting with another person has: a "large" tendency of the stay time in the target area and a "small" tendency of the $E_{total}$.

The person who has just passed has: a "small" tendency of the stay time in the target area and a "large" tendency of the $E_{total}$.

That is, the DS tends to be larger for a person who is prowling than for a person who is meeting with another person or a person who has just passed.

"Frequency of Framing in Image" A person who is prowling around the target area repeats framing in and framing out of the image. As a result, a person who is prowling around the target area tends to have a higher frequency of framing in the image. By using the frequency, a person who is prowling around the target area can be extracted with high accuracy.

The computation unit 12 computes the frequency of framing in the image generated by each camera 100 for each person and for each camera 100. A method of detecting framing in is not particularly limited. For example, the computation unit 12 may compute an RAS indicating the frequency of framing in the image for each person based on the following Equation (7). j is a camera ID. n is the number of cameras.

$$RAS = \frac{\sum_{j=1}^{n} CS_j}{n} \qquad \text{Equation (7)}$$

$CS_j$ is defined by the following Equation (8). j is a camera ID. "ca" is the number of times the person has framed in the image generated by each camera.

$$CS_j = 2^{(ca-1)} \qquad \text{Equation (8)}$$

In a case of the example, as the frequency of framing in the image is larger, the RAS becomes a larger value. The person who is prowling tends to have a larger RAS.

"Value Obtained by Integrating First Value and Frequency of Framing in Image (Fourth Value)"

By using the two indices of "the first value" and "the frequency of framing in the image", it is possible to extract a person who is prowling around the target area with higher accuracy.

The computation unit 12 may compute an LS (fourth value) for each person based on, for example, the following Equation (9). The method of computing the RAS and the DS is as described above.

$$LS = RAS \times DS \qquad \text{Equation}$$

In a case of the example, as the DS (first value) is larger, the LS (fourth value) becomes larger. That is, as the stay time in the target area is larger, the LS (fourth value) becomes a larger value. Further, as the bias of the appearance position in the target area is smaller, the LS (fourth value) becomes a larger value. Further, as the RAS (frequency of framing in the image) is larger, the LS (fourth value) becomes larger. That is, a person who is prowling tends to have a larger LS.

"Value Obtained by Correcting Fourth Value (Fifth Value)"

The computation unit 12 may compute a WLS (fifth value) for each person based on, for example, the following Equation (10). The "number of times of appearance in the target area" is the number of times each person has appeared in the target area. For example, in a case where a person appears in the target area, leaves the target area, and then reappears in the target area, the number of times of appearance is two.

$$WLS = \frac{LS}{\text{number of times of appearance in target area}} \qquad \text{Equation (10)}$$

A method for detecting the number of times of appearance is not particularly limited. For example, in a case where a person is photographed by any one of the plurality of cameras 100 installed in the target area, and a non-photographing time during which the person is not photographed by any one of the plurality of cameras 100 installed in the target area exceeds a reference value, the person may be determined to have once left the target area. Then, when the person is photographed again by any one of the cameras 100, the number of times of appearance may be incremented by one.

In a case of the example, as the LS (fourth value) is larger, the WLS (fifth value) becomes larger. That is, as the stay time in the target area is larger, the WLS (fifth value) becomes a larger value. Further, as the bias of the appearance position in the target area is smaller, the WLS (fifth value) becomes a larger value. Also, as the RAS (frequency of framing in the image) is larger, the WLS (fifth value) becomes larger. In other words, a person who is prowling tends to have a larger WLS.

Returning to FIG. 2, the target person extraction unit 13 extracts a target person who is a person for whom the computation result by the computation unit 12 satisfies a predetermined condition.

For example, the target person extraction unit 13 may extract a person for whom the first value satisfies a predetermined condition as a target person. In a case of the specific example described above, as the stay time in the target area is larger, the DS (first value) becomes a larger value. Further, as the bias of the appearance position in the target area is smaller, the DS (first value) becomes a larger value. The person who is prowling tends to have a larger DS.

In a case of the example, the target person extraction unit 13 extracts a person for whom the DS (first value) is equal to or more than a reference value as a target person.

Alternatively, the target person extraction unit 13 may extract a person for whom the fourth value satisfies a predetermined condition as a target person. In a case of the specific example described above, as the DS (first value) is larger, the LS (fourth value) becomes larger. That is, as the stay time in the target area is larger, the LS (fourth value) becomes a larger value. Further, as the bias of the appearance position in the target area is smaller, the LS (fourth value) becomes a larger value. Further, as the RAS (frequency of framing in the image) is larger, the LS (fourth value) becomes larger. Then, a person who is prowling tends to have a larger LS (fourth value).

In a case of the example, the target person extraction unit 13 extracts a person for whom the LS (fourth value) is equal to or more than a reference value as a target person.

Alternatively, the target person extraction unit 13 may extract a person for whom the fifth value satisfies a predetermined condition as a target person. In a case of the specific example described above, as the LS (fourth value) is larger, the WLS (fifth value) becomes larger. That is, as the stay time in the target area is larger, the WLS (fifth value) becomes a larger value. Further, as the bias of the appearance position in the target area is smaller, the WLS (fifth value) becomes a larger value. Also, as the RAS (frequency of framing in the image) is larger, the WLS (fifth value) becomes larger. Then, a person who is prowling tends to have a larger WLS (fifth value).

In a case of the example, the target person extraction unit 13 extracts a person for whom the WLS (fifth value) is equal to or more than a reference value as a target person.

Alternatively, the target person extraction unit 13 may extract a person for whom the frequency of framing in the image satisfies a predetermined condition as a target person. In the case of the specific example described above, the target person extraction unit 13 may extract a person for whom the RAS (frequency of framing in the image) is equal to or more than a reference value as a target person. Alternatively, the target person extraction unit 13 may extract a person for whom the number of times of framing in the image within a reference time is equal to or more than the reference value as a target person.

Note that, the reference value and the reference time are design matters.

The processing apparatus 10 may output a processing result made by the person detection unit 11, the computation unit 12, and the target person extraction unit 13. The output is realized through any output apparatus such as a display, an emailer, a projection apparatus, and a printer.

Figure 6:
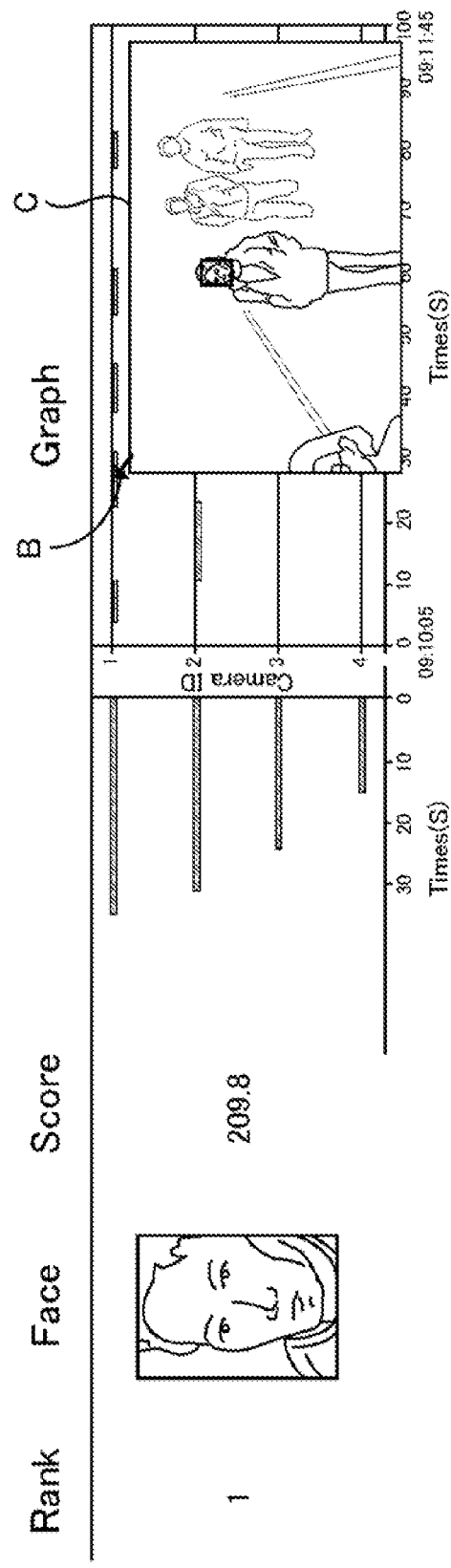
FIG. 6 is a diagram showing an example of information output by a processing apparatus.

FIG. 6 shows an example of information output by the processing apparatus 10. In the example shown in the drawing, the target persons extracted by the target person extraction unit 13 are ranked based on the scores, and are listed and displayed in order of the rank.

"Rank" in the drawing is a rank based on the score. For example, the target persons are ranked in descending order of the score. "Face" is a face image of each target person. "Score" is a computation result computed by the computation unit 12 and used in the extraction processing by the target person extraction unit 13. The "Score" is, for example, the DS (first value), the LS (fourth value), the WLS (fifth value), the RAS (frequency of framing in the image), and the like.

"Graph" is a graph showing a situation where each target person is photographed by each camera 100. In the area on the right side of "Camera ID" in the drawing, the graph shows a period of time in which each target person was photographed by each of the plurality of cameras (camera IDs 1 to 4 in the drawing). When any position in the photographed period of time is specified by an icon B in the drawing, as shown in the drawing, the photographed image is reproduced from the specified time point (image C). In addition, a still image at the specified time point may be displayed. In the area on the left side of "Camera ID" in the drawing, the bar graph shows a total time during which each target person was photographed by each of the plurality of cameras (camera IDs 1 to 4 in the drawing).

Figure 7:
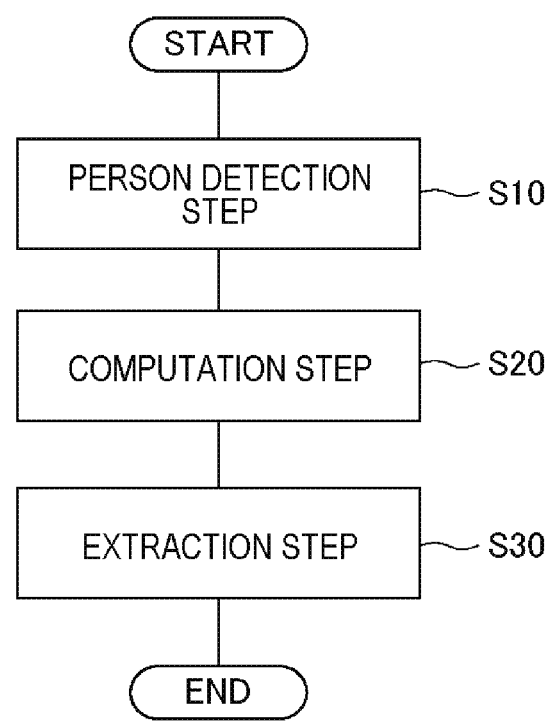
FIG. 7 is a flowchart showing an example of a processing flow of a processing apparatus.

Next, an example of a processing flow of the processing apparatus 10 of the present example embodiment will be described with reference to the flowchart of FIG. 7.

In the person detection step S10, the person detection unit 11 detects a person from an image generated by the camera 100 that photographs the target area.

In the computation step S20, the computation unit 12 analyzes the image and computes a predetermined value for each person. For example, the computation unit 12 computes at least some of "stay time in the target area", "degree of bias of the appearance position in the target area", "value obtained by integrating the stay time in the target area and the degree of bias of the appearance position in the target area (first value)", "frequency of framing in the image", "value obtained by integrating the first value and the frequency of framing in the image (fourth value)", and "value obtained by correcting the fourth value".

In the extraction step S30, the target person extraction unit 13 extracts a target person who is a person for whom the computation result by the computation unit 12 satisfies a predetermined condition.

According to the processing apparatus 10 of the present example embodiment described above, it is possible to extract a person who is prowling around the target area with high accuracy. According to the processing apparatus 10 of the present example embodiment, it is possible to reduce the inconvenience of extracting a person who is meeting with another person in the target area or a person who simply passes through the target area, and to extract a person who is prowling around the target area.

Hereinafter, examples of a reference example embodiment will be additionally described.

1. A processing apparatus including:
a person detection unit that detects a person from an image generated by a camera that photographs a target area;
a computation unit that analyzes the image and computes, for each person, a stay time in the target area and a degree of bias of an appearance position in the target area; and
a target person extraction unit that extracts a target person who is a person for whom a computation result by the computation unit satisfies a predetermined condition.

2. The processing apparatus according to 1,
in which the computation unit computes a first value indicating a behavior in the target area based on the stay time and the degree of bias.

3. The processing apparatus according to 1 or 2,
in which the computation unit computes the degree of bias based on a second value indicating a frequency of being photographed by each of a plurality of the cameras.

4. The processing apparatus according to any one of 1 to 3,
in which the computation unit computes the degree of bias based on a third value indicating a frequency of existence in each of a plurality of small areas in the image generated by the camera.

5. The processing apparatus according to 4,
in which the computation unit computes the degree of bias based on both a second value indicating a frequency of being photographed by each of a plurality of the cameras, and the third value.

6. The processing apparatus according to any one of 1 to 5,
in which the computation unit computes, for each person, a frequency of framing in the image.

7. The processing apparatus according to 6,
in which the computation unit computes, for each person, a fourth value that indicates a behavior in the target area, based on both a first value indicating a behavior in the target area computed based on the stay time and the degree of bias, and the frequency of framing in the image.

8. The processing apparatus according to 7,
in which the computation unit computes, for each person, a fifth value obtained by correcting the fourth value by the number of times of appearance in the target area.

9. The processing apparatus according to any one of 1 to 5,
in which the target person extraction unit extracts a person for whom a first value indicating a behavior in the target area computed based on the stay time and the degree of bias satisfies a predetermined condition as the target person.

10. The processing apparatus according to 7,
in which the target person extraction unit extracts a person for whom the fourth value satisfies a predetermined condition as the target person.

11. The processing apparatus according to 8,
in which the target person extraction unit extracts a person for whom the fifth value satisfies a predetermined condition as the target person.

12. A processing apparatus including:
a person detection unit that detects a person from an image generated by a camera that photographs a target area;
a computation unit that analyzes the image and computes, for each person, a frequency of framing in the image; and
a target person extraction unit that extracts a target person who is a person for whom the frequency of framing in the image satisfies a predetermined condition.

13. A processing method executed by a computer, the method including:
a person detection step of detecting a person from an image generated by a camera that photographs a target area;
a computation step of analyzing the image and computing, for each person, a stay time in the target area and a degree of bias of an appearance position in the target area; and
a target person extraction step of extracting a target person who is a person for whom a computation result in the computation step satisfies a predetermined condition.

14. A program causing a computer to function as:
a person detection unit that detects a person from an image generated by a camera that photographs a target area;
a computation unit that analyzes the image and computes, for each person, a stay time in the target area and a degree of bias of an appearance position in the target area; and
a target person extraction unit that extracts a target person who is a person for whom a computation result by the computation unit satisfies a predetermined condition.

15. A processing method executed by a computer, the method including:
a person detection step of detecting a person from an image generated by a camera that photographs a target area;
a computation step of analyzing the image and computing, for each person, a frequency of framing in the image; and
a target person extraction step of extracting a target person who is a person for whom the frequency of framing in the image satisfies a predetermined condition.

16. A program causing a computer to function as:
a person detection unit that detects a person from an image generated by a camera that photographs a target area;
a computation unit that analyzes the image and computes, for each person, a frequency of framing in the image; and
a target person extraction unit that extracts a target person who is a person for whom the frequency of framing in the image satisfies a predetermined condition.

The invention claimed is:

1. A processing apparatus comprising:
at least one memory configured to store one or more instructions; and
at least one processor configured to execute the one or more instructions to:
detect one or more persons from an image generated by a camera that photographs a target area;
analyze the image and compute, for each person, a stay time of the person in the target area and a degree of bias of an appearance position of the person in the target area; and
extract a target person who is the person for whom a result of computation satisfies a predetermined condition, the computation indicating the stay time and the degree of bias of the appearance position,
wherein, for each person, the degree of bias of the appearance position corresponds to whether the person is moving around the target area or is staying within proximity of any certain position within the target area,
and wherein the processor is further configured to execute the one or more instructions to:
compute, for each person, a frequency of framing in the image;
compute, for each person, a fourth value indicating a behavior in the target area, based on both a first value indicating a behavior in the target area computed based on the stay time and the degree of bias, and the frequency of framing in the image; and
compute, for each person, a fifth value obtained by correcting the fourth value by the number of times of appearance in the target area.

2. The processing apparatus according to claim 1,
wherein the processor is further configured to execute the one or more instructions to compute a first value indicating a behavior in the target area based on the stay time and the degree of bias.

3. The processing apparatus according to claim 1,
wherein the camera is a first camera, and the processor is further configured to execute the one or more instructions to compute the degree of bias based on a second value indicating a frequency of being photographed by each of a plurality of cameras include the first camera.

4. The processing apparatus according to claim 1,
wherein the processor is further configured to execute the one or more instructions to compute the degree of bias based on a third value indicating a frequency of existence in each of a plurality of areas, of a threshold size, in the image generated by the camera.

5. The processing apparatus according to claim 4,
wherein the camera is a first camera, and the processor is further configured to execute the one or more instructions to compute the degree of bias based on both a second value indicating a frequency of being photographed by each of a plurality of cameras including the first camera and the third value.

6. The processing apparatus according to claim 1,
wherein the processor is further configured to execute the one or more instructions to extract the person for whom a first value indicating a behavior in the target area computed based on the stay time and the degree of bias satisfies a predetermined condition as the target person.

7. The processing apparatus according to claim 1,
wherein the processor is further configured to execute the one or more instructions to extract the person for whom the fourth value satisfies a predetermined condition as the target person.

8. The processing apparatus according to claim 1,
wherein the processor is further configured to execute the one or more instructions to extract the person for whom the fifth value satisfies a predetermined condition as the target person.

9. A processing apparatus comprising:
at least one memory configured to store one or more instructions; and
at least one processor configured to execute the one or more instructions to:
detect one or more persons from an image generated by a camera that photographs a target area;
analyze the image and compute, for each person, a frequency of change from a first state where the person is not in the image to a second state where the person is in the image; and
extract a target person who is the person for whom the frequency of change in the image satisfies a predetermined condition.

10. A processing method executed by a computer, the method comprising: detecting one or more persons from an image generated by a camera that photographs a target area;
analyzing the image and computing, for each person, a stay time of the person in the target area and a degree of bias of an appearance position of the person in the target area;
extracting a target person who is the person for whom a result of computation satisfies a predetermined condition, the computation indicating the stay time and the degree of bias of the appearance position,
wherein, for each person, the degree of bias of the appearance position corresponds to whether the person is moving around the target area or is staying within proximity of any certain position within the target area;
computing, for each person, a frequency of framing in the image;
computing, for each person, a fourth value indicating a behavior in the target area, based on both a first value indicating a behavior in the target area computed based on the stay time and the degree of bias, and the frequency of framing in the image; and
computing, for each person, a fifth value obtained by correcting the fourth value by the number of times of appearance in the target area.

11. A non-transitory storage medium storing a program causing a computer to:
detect one or more persons from an image generated by a camera that photographs a target area;
analyze the image and compute, for each person, a stay time of the person in the target area and a degree of bias of an appearance position of the person in the target area;
extract a target person who is the person for whom a result of computation satisfies a predetermined condition, the computation indicating the stay time and the degree of bias of the appearance position,
wherein, for each person, the degree of bias of the appearance position corresponds to whether the person is moving around the target area or is staying within proximity of any certain position within the target area;
compute, for each person, a frequency of framing in the image;
compute, for each person, a fourth value indicating a behavior in the target area, based on both a first value indicating a behavior in the target area computed based on the stay time and the degree of bias, and the frequency of framing in the image; and
compute, for each person, a fifth value obtained by correcting the fourth value by the number of times of appearance in the target area.

12. A processing method executed by a computer, the method comprising:
detecting one or more persons from an image generated by a camera that photographs a target area;
analyzing the image and computing, for each person, a frequency of change from a state where the person is not in the image to a state where the person is in the image; and
extracting a target person who is the person for whom the frequency of change in the image satisfies a predetermined condition.

13. A non-transitory storage medium storing a program causing a computer to:
detect a person from an image generated by a camera that photographs a target area; analyze the image and compute, for each person, a frequency of change from a state where the person is not in the image to a state where the person is in the image; and
extract a target person who is the person for whom the frequency of change in the image satisfies a predetermined condition.

* * * * *